(12) United States Patent
Handmer et al.

(10) Patent No.: US 11,391,002 B2
(45) Date of Patent: Jul. 19, 2022

(54) METAMATERIAL NULL FLUX MAGNETIC BEARING SYSTEM

(71) Applicant: Hyperloop Technologies, Inc., Los Angeles, CA (US)

(72) Inventors: Casey Handmer, S Pasadena, CA (US); Brian Towle, Los Angeles, CA (US); James Coutre, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 141 days.

(21) Appl. No.: 16/725,842

(22) Filed: Dec. 23, 2019

(65) Prior Publication Data

US 2020/0131712 A1 Apr. 30, 2020

Related U.S. Application Data

(63) Continuation of application No. 15/471,720, filed on Mar. 28, 2017, now Pat. No. 10,533,289.

(60) Provisional application No. 62/314,081, filed on Mar. 28, 2016.

(51) Int. Cl.
*E01B 25/30* (2006.01)
*F16C 32/04* (2006.01)

(52) U.S. Cl.
CPC ........ *E01B 25/305* (2013.01); *F16C 32/0461* (2013.01); *F16C 32/0468* (2013.01); *F16C 32/0472* (2013.01); *F16C 2326/10* (2013.01)

(58) Field of Classification Search
CPC ................ E01B 25/305; F16C 32/0461; F16C 32/0468; F16C 32/0472; F16C 2326/10
See application file for complete search history.

(56) References Cited

U.S. PATENT DOCUMENTS

| 2,488,287 A | 11/1949 | Goddard |
| 2,511,979 A | 6/1950 | Goddard |
| 3,470,828 A | 10/1969 | Powell, Jr. et al. |
| 3,828,200 A | 8/1974 | Pradenne et al. |

(Continued)

FOREIGN PATENT DOCUMENTS

| EP | 2371613 | 10/2011 |
| WO | WO2003002370 | 1/2003 |

(Continued)

OTHER PUBLICATIONS

Musk, E., "Hyperloop White Paper," dated Aug. 12, 2013.

(Continued)

*Primary Examiner* — Robert J McCarry, Jr.
(74) *Attorney, Agent, or Firm* — Greenblum & Bernstein, P.L.C.

(57) ABSTRACT

A track element of a non-contact bearing extending in a length direction. The track element includes a conductive material strip having a facing surface with a height and width and a rear surface opposite the facing surfaces. The conductive material strip includes a slit extending in a height direction to form a first leg and a second leg, in which the first leg is bent in a zig-zag shape and the second leg is bent in a zig-zag shape that is complementary to the bending of the first leg. When the conductive material strip is viewed in a direction parallel to the facing surface, the first leg and the second leg cross each other at least once.

21 Claims, 9 Drawing Sheets

(56) References Cited

U.S. PATENT DOCUMENTS

| | | | |
|---|---|---|---|
| 3,952,667 A | 4/1976 | Kovanov et al. |
| 3,954,064 A | 5/1976 | Minovitch |
| 4,075,948 A | 2/1978 | Minovitch |
| 4,131,811 A | 12/1978 | Apsit |
| 4,148,260 A | 4/1979 | Minovitch |
| 4,202,272 A | 5/1980 | Teodorescu et al. |
| 4,603,640 A | 8/1986 | Miller et al. |
| 4,636,666 A | 1/1987 | Meins |
| 4,636,667 A | 1/1987 | Holzinger et al. |
| 5,053,654 A | 10/1991 | Augsburger et al. |
| 5,146,853 A | 9/1992 | Suppes |
| 5,178,072 A | 1/1993 | Suzuki |
| 5,275,112 A | 1/1994 | Rote et al. |
| 5,481,146 A | 1/1996 | Davey |
| 5,619,930 A | 4/1997 | Alimanestiano |
| 5,656,350 A | 8/1997 | Koyama |
| 5,657,697 A | 8/1997 | Murai |
| 5,712,514 A | 1/1998 | Fischperer et al. |
| 5,950,543 A | 9/1999 | Oster |
| 6,160,327 A | 12/2000 | Wang |
| 6,250,230 B1 | 6/2001 | Post |
| 6,357,359 B1 | 3/2002 | Davey |
| 6,374,746 B1 | 4/2002 | Fiske |
| 6,418,857 B1 | 7/2002 | Okano et al. |
| 6,502,517 B1 | 1/2003 | Groening et al. |
| 6,510,799 B2 | 1/2003 | Lamb et al. |
| 6,584,671 B2 | 7/2003 | Miller et al. |
| 6,629,503 B2 | 10/2003 | Post |
| 6,633,217 B2 | 10/2003 | Post |
| 6,664,880 B2 | 12/2003 | Post |
| 6,684,794 B2 | 2/2004 | Fiske et al. |
| 6,758,146 B2 | 7/2004 | Post |
| 6,899,036 B2 | 5/2005 | Lamb et al. |
| 7,096,794 B2 | 8/2006 | Post |
| 7,204,192 B2 | 4/2007 | Lamb et al. |
| 7,478,598 B2 | 1/2009 | Post |
| 7,835,830 B2 | 11/2010 | Ellmann et al. |
| 7,841,564 B2 | 11/2010 | Ellmann et al. |
| 8,118,266 B2 | 2/2012 | Zheng et al. |
| 8,171,859 B2 | 5/2012 | Loser et al. |
| 8,250,990 B2 | 8/2012 | Kunz |
| 8,281,723 B2 | 10/2012 | Loeser et al. |
| 8,297,195 B2 | 10/2012 | Loser et al. |
| 8,402,899 B2 | 3/2013 | Loeser et al. |
| 8,430,037 B2 | 4/2013 | Miller et al. |
| 8,430,039 B2 | 4/2013 | Zheng et al. |
| 8,459,188 B2 | 6/2013 | Miller et al. |
| 8,534,197 B2 | 9/2013 | Miller |
| 8,578,860 B2 | 11/2013 | Post |
| 8,915,192 B2 | 12/2014 | Zhou |
| 8,917,086 B2 | 12/2014 | Post |
| 8,985,030 B2 | 3/2015 | Post |
| 9,085,304 B2 | 7/2015 | Oster |
| 9,228,298 B2 | 1/2016 | Oster |
| 9,254,759 B1 | 2/2016 | Henderson et al. |
| 9,290,187 B2 | 3/2016 | Dalrymple |
| 9,290,278 B2 | 3/2016 | Dillon |
| 9,302,577 B2 | 4/2016 | Catalan |
| 9,457,687 B2 | 10/2016 | Brier et al. |
| 9,641,117 B2 | 5/2017 | Jetti et al. |
| 2002/0089237 A1* | 7/2002 | Hazelton ............ H02K 41/03 310/12.25 |
| 2003/0111916 A1 | 6/2003 | Baccini |
| 2003/0205163 A1 | 11/2003 | Lamb et al. |
| 2006/0233616 A1* | 10/2006 | Friedmann ............ E02D 27/50 405/224 |
| 2006/0236890 A1 | 10/2006 | Lamb et al. |
| 2006/1233616 | 10/2006 | Friedmann |
| 2007/0089636 A1 | 4/2007 | Guardo |
| 2007/0192000 A1 | 8/2007 | Ellmann et al. |
| 2008/0236973 A1 | 10/2008 | Hahn et al. |
| 2010/0031846 A1 | 2/2010 | Loser et al. |
| 2010/0192799 A1 | 8/2010 | Miller |
| 2012/0019235 A1 | 1/2012 | Post |
| 2012/0089525 A1 | 4/2012 | Kley et al. |
| 2012/0174901 A1 | 7/2012 | Post |
| 2013/0174757 A1 | 7/2013 | Post |
| 2014/0000473 A1 | 1/2014 | Miller |
| 2014/0116406 A1 | 5/2014 | Post |
| 2014/0261055 A1 | 9/2014 | Oster |
| 2014/0354064 A1 | 12/2014 | Tseliakhovich |
| 2016/0009196 A1 | 1/2016 | Allard |
| 2016/0023668 A1 | 1/2016 | Shetty |
| 2016/0033970 A1 | 2/2016 | Henderson et al. |
| 2016/0059868 A1 | 3/2016 | Allaire |
| 2016/0229418 A1 | 8/2016 | Brambrogan et al. |
| 2016/0233754 A1* | 8/2016 | Dorris ............ H02K 3/04 |
| 2016/0325761 A1 | 11/2016 | Preussmeier et al. |
| 2017/0005607 A1 | 1/2017 | Brier et al. |
| 2017/0036562 A1 | 2/2017 | Sonnerer et al. |
| 2017/0008023 A1 | 3/2017 | Kley et al. |
| 2017/0080823 A1 | 3/2017 | Kley et al. |
| 2017/0082124 A1 | 3/2017 | Kreymeyer |

FOREIGN PATENT DOCUMENTS

| | | |
|---|---|---|
| WO | WO2003003389 | 1/2003 |
| WO | WO2007087028 | 8/2007 |
| WO | WO2009/135389 | 11/2009 |

OTHER PUBLICATIONS

Wright, I., "Engineering the Hyperloop: Testing 4 Core Elements," dated Feb. 16, 2016.

Protalinski, E., "Hyperloop's intro video claims the future is now," dated Sep. 17, 2015.

Int'l Search Report and Written Opinion conducted in Int'l Appln. No. PCT/US201/023564 (Forms PCT/ISA/210; PCT/ISA/237).

\* cited by examiner

METAMATERIAL NULL FLUX MAGNETIC BEARING SYSTEM

CROSS-REFERENCE TO RELATED APPLICATIONS

The present application is a continuation of U.S. application Ser. No. 15/471,720 filed Mar. 28, 2017, which claims the benefit under 35 U.S.C. § 119(e) of U.S. Provisional Application No. 62/314,081 filed Mar. 28, 2016, the disclosures of which are expressly incorporated by reference herein in their entireties.

BACKGROUND OF THE INVENTION

1. Field of the Invention

The present disclosure relates to a bearing system and method, in particular, in non-contact systems.

2. Discussion of Background Information

There are three key metrics for measuring the utility of a magnetic bearing system, also called a levitation system: lift-to-drag ratio, lift-to-system mass ratio, and levitation length. The lift-to-drag ratio measures the vertical force created by the system compared to the frictional deceleration force parallel to the direction of motion. For the lift-to-system mass ratio, the weight of the system is measured against its ability to create a vertical force. If the levitation system comprises the majority of the system's weight, then the levitation system's utility may be severely limited. The levitation length measures what length of levitation system is necessary for a nominal system's mass. For example, if the levitation length exceeds the length of the vehicle, then the entire system may be impractical.

One exemplary use for a magnetic bearing system may be in an ultra-high speed, high efficiency transportation system that may utilize a low pressure environment in order to reduce drag on a vehicle at high operating speeds, thus providing the dual benefit of allowing greater speed potential and lowering the energy costs associated with overcoming drag forces. These systems may use a near vacuum within a tubular structure in which the vehicle moves. These systems may utilize any number of acceleration systems to achieve the desired high speed for the vehicle, including electromagnetic propulsion. Due to the scale of the project, tremendous forces are required to accelerate the vehicle to the operating speed.

Due to the unprecedented nature of the sustained, ultra-high speed configuration of the system, the vehicle needs to utilize a carriage that can withstand the frictional demands of the high speed and high use. Conventional carriage systems, such as wheels, will not provide the durability or efficiency for the transportation system to be operable, let alone useful.

Many passive levitation systems suffer from poor lift-to-drag ratio, poor lift-to-magnet mass ratio, sub-optimal stiffness in both transverse directions, poor stability characteristics, and/or low ride height. However, these problems are not limited to passive maglev, and have been found to affect active maglev systems as well. These problems exist because of the limitations of permanent and electro-magnets and/or control circuits, the necessity to reduce track capital expenses even at the cost of higher operational expenses, and limited use of automation in manufacture. Both track- and vehicle-side systems to address these issues are often expensive, difficult to manufacture, ineffective, or all three.

SUMMARY OF THE EMBODIMENTS

Embodiments of the invention are directed to a structure and method for operating a non-contact bearing system, e.g., a levitation system. In embodiments, the levitation system can be used in a transportation system, e.g., a transportation system as described in commonly-assigned application Ser. No. 15/007,783, titled "Transportation System," the disclosure of which are expressly incorporated by reference herein in its entirety.

In embodiments, the levitation system can be a passive magnetic levitation (maglev) system that utilizes a magnetic force created as a magnet assembly passes at velocity over a track, which generates lift to provide vertical displacement between the magnet assembly and the track. In this way, a levitation force is generated on the magnet assembly, which is derived from the magnet assembly's motion along the track. The system can include at least one stationary track and a plurality of magnetic arrays that are connected in such a manner as to be substantially parallel to a length direction of the track.

The track can be a metamaterial embodied or formed by a stacked, tessellated set of foils or elements of a stamped piece forming, e.g., aluminum or copper conductors. Each stamped conductor can be deformed to produce a predefined profile. The conductor can be slotted or solid. Alternatively, litz wire braid could also be used. The foils or elements of the stamped piece, when viewed in a direction that would be orthogonal to a length direction of the track, can take a form that reveals a geometry similar to a plurality of vertically oriented polygons, such as hexagons or diamonds, that are substantially stacked one atop the other, such that a bottom point of an upper diamond is connected to an upper point of a lower diamond.

In exemplary embodiments, at least one set of magnet arrays can be positioned adjacent to each diamond point, so that the magnet arrays are vertically offset and parallel to each other and each magnet array is substantially aligned adjacent to a diamond. There may also be a second set of magnet arrays, in which each magnet array of the second set is arranged substantially horizontally parallel to respective magnet arrays of the first set, but on arranged on an opposite side of each diamond. Thus, in embodiments, the entire track and magnet array configuration can be substantially symmetrical in its vertical axis. Moreover, in embodiments, a horizontal distance of the magnet arrays to the track can be closer than a vertical distance between the magnet arrays of a same set.

When the magnet array is moving in a direction substantially along or parallel to the length of the track, a current may be produced within the track. However, in accordance with embodiments of the disclosure, the track elements possess a null flux geometry such that, while the magnet arrays are in a designated neutral position, the magnets generate approximately zero electromotive force (EMF) and approximately zero current. When the magnet array is displaced relative to the neutral position, e.g., such as from the force of gravity, the null flux circuit experiences a net EMF due to Lenz's law, and the resulting current generates a set of opposing magnetic poles that exerts at least lift, drag, and orthogonal force on the magnet array. Further, as the overlapping conducting path of the metamaterial is not left-right mirror symmetric, the system in embodiments may utilize a total of three loops of substantially, but not necessarily, identical sizes, such that any torque or lateral deflection induced by an upper null flux crossing, e.g., where the two upper loops meet, is substantially cancelled by the lower null flux crossing, e.g., where the two lower loops meet. The neutral position can be tuned to account for different properties of a supported load, such as weight, by adjusting the distance and/or orientation and/or configuration of the magnet arrays.

Another embodiment of the present disclosure comprises a method for assembling a metamaterial track. A roll of a metal or a metal alloy, such as aluminum, is first selected of specific width and specific thickness. The roll of alloy is then put through, e.g., a bending machine or a stamping machine, such as a rotary bending machine, configured to deform the alloy into a specific selected geometry, such as, e.g., a three-diamond configuration. This can be achieved by cutting a slit vertically through a discrete portion of the roll such that there is a leg created that is attached to the roll at one or both ends of the width. The stamping machine will then bend the leg at a plurality of points such that the leg appears zig-zagged. In embodiments, the bends can be (but are not necessarily) of equal angle. The stamping machine will then slit and bend the next leg in a similar, but opposite, process such that the two legs superimposition seem to form diamonds. The diamond track element, formed as a result of the described process, can be separated from the roll. A robot or person will then be used to place the track elements and complete the assembly process.

Other embodiments of the present disclosure consider using a plurality of tracks over which the magnet assembly travels, such as one on the left side of the magnet assembly and one on the right, to increase stability of the system. Still other embodiments consider hanging the track, such that the magnet assembly would be suspended vertically from the track system. Further embodiments consider using the track at an angled orientation in relation to the magnet assembly.

Embodiments are directed to a track element of a non-contact bearing extending in a length direction. The track element includes a conductive material strip having a facing surface with a height and width and a rear surface opposite the facing surface. The conductive material strip includes a slit extending in a height direction to form a first leg and a second leg, in which the first leg is bent in a zig-zag shape and the second leg is bent in a zig-zag shape that is complementary to the bending of the first leg. When viewing the conductive material strip from a width side in a direction parallel to the facing surface, the first leg and the second leg cross each other at least once.

According to embodiments, the first and second legs can be configured to be parallel to each other.

In accordance with other embodiments, along the slit, the first and second leg can be arranged in a non-contacting manner.

In further embodiments, the first and second leg may be connected to each other at at least one of a top or a bottom of the slit. Moreover, the first and second leg can be connected to each other at both the top and bottom of the slit.

According to other embodiments, the track elements may be nested so that the facing surface of one of the conductive material strips is parallel to the rear surface of an adjacent one of the conductive material strips.

In accordance with still other embodiments, a material of the conductive material strips may include one of a conductor metal or metal alloy. Further, the one of conductor metal or metal alloy can include aluminum, copper, or graphite.

According to embodiments, the conductive material strip can have a height of 12", a thickness of 0.5 mm, and the first and second legs can have widths of 0.25".

In accordance with other embodiments, when the conductive material strip is viewed in the direction parallel to the facing surface, the first leg and the second leg cross each other at least twice.

According to still other embodiments, a null flux crossing can be establishable where the first and second leg, when viewed in the direction parallel to the facing surface, cross each other.

In embodiments, a non-contact bearing includes a plurality of the above-described track elements. The track elements are nested so that the facing surface of one of the conductive material strips is parallel to the rear surface of an adjacent one of the conductive material strips.

According to embodiments, the plurality of nested track elements can be fixedly joined together. Further, the plurality of nested track elements may be fixedly joined together by glue or plastic.

In further embodiments, an insulating layer can be arranged between each conductive material strip. The insulating layer may include aluminum oxide. Further, the aluminum oxide layer can be formed on the facing and rear surface of each conductive material strip.

Embodiments are directed to a method for forming a non-contact bearing having a length direction. The method includes nesting a plurality of track elements together in the length direction. Each track element is configured so that, when the plurality of track elements are nested together, at least one null flux crossing is establishable in the length direction.

In embodiments, each track element can include a conductive material strip having a facing surface with a height and width and a rear surface opposite the facing surface. Each conductive material strip may include a first leg bent in a zig-zag shape and a second leg bent in a zig-zag shape that is complementary to the bending of the first leg. Further, when the conductive material strip is viewed in a direction parallel to the facing surface, the first leg and the second leg cross each other at least once. Further, the track elements may be nested together so that the facing surface of one of the conductive material strips is parallel to the rear surface of an adjacent one of the conductive material strips. Moreover, before nesting the plurality of track elements together, the method can include forming an insulating layer on at least one of the facing surface or rear surface of each conductive material strip, so that the each of nested track elements are separated from each other by an insulating layer.

In accordance with still yet other embodiments, each track element can be configured so that, when the plurality of track elements are nested together, at least two null flux crossings, which are establishable in the length direction, are separated in a height direction of the non-contact bearing.

Embodiments of the invention are directed to a non-contact bearing having a geometry that includes a plurality of track elements arranged to nest together in a length direction. The plurality of track elements are shaped to define at least an upper and a lower null flux crossing and the plurality of nested track elements form a conductive metamaterial.

In embodiments, each track element can include a first bent leg and a second bent leg. Further, the first and second bent legs, when viewed in a direction normal to the travel direction, form three adjacent stacked loops.

According to embodiments, the metamaterial can further include an insulating layer arranged between each of the nested track elements.

In accordance with further embodiments, the non-contact bearing can further include a vehicle arranged to travel along the metamaterial, the vehicle including at least a pair of magnet arrays arranged parallel to each other on a first side of the metamaterial. Further, the magnet arrays can extend in the travel direction. Also, as the vehicle travels along the metamaterial, the pair of magnet arrays may be arranged to travel along the upper and lower null points. In embodiments, the metamaterial can be arranged so that the vehicle travels over the metamaterial. Alternatively, the metamaterial can be arranged so that the vehicle travels suspended from the metamaterial. In further embodiments, the non-contact bearing can include at least a second pair of magnet arrays arranged parallel to each other on a second side of the metamaterial, which is opposite the first side, wherein the magnet arrays on the first side are arranged parallel to the magnet arrays on the second side. In other embodiments, the magnet arrays may include a plurality of magnetic elements in which a north-south direction for each magnetic element is shifted 90° from an adjacent magnetic element. In still other embodiments, a movement of the magnet arrays over the metamaterial at a predefined velocity creates a magnetic force to generate lift that provides vertical displacement between the vehicle and the metamaterial. According to still other embodiments, on at least the first side of the metamaterial: the magnet assembly along the upper null flux crossing comprises a plurality of magnet sets in which each magnet set comprises four individual magnets of which respective N-poles are pointed in different directions and the N-poles of each adjacent magnet are 90° offset from each other, and the magnet assembly along the lower null flux crossing comprises a plurality of magnet sets in which each magnet set comprises four individual magnets of which respective N-poles are pointed in a direction opposite the N-poles of respective magnets of the magnet assembly along the upper null flux crossing located vertically above.

Embodiments are directed to a method of forming the metamaterial of the above-described transport system, which includes forming a first leg of one individual track element from a conductive material and bending the first leg to form a first part of a first individual track element; forming a second leg of the one individual track element from the conductive material and bending the second leg in a complementary manner to that of the first leg to form the first individual track element; forming a first leg of another individual track element from a conductive material and bending the first leg to form a first part of a second individual track element; forming a second leg of the other individual track element from the conductive material and bending the second leg in a complementary manner to that of the first leg to form the second individual track element; and stacking the first individual track element and the second individual track element together, whereby the respective first legs and the respective second legs are arranged nested together.

According to embodiments, before the stacking, the method may includes inserting an insulator layer between the first individual track element and the second individual track element.

In accordance with other embodiments, before the stacking, the method can include forming an insulator layer on at least one of the first individual track element and the second individual track element.

According to still other embodiments, the bent legs of the first and second individual track elements form stacked diamonds. Further, a crossing point between an upper diamond and a middle diamond can form an upper null flux crossing and a crossing point between the middle diamond and a lower diamond can form a lower null flux crossing.

Embodiments are directed to a method for constructing a metamaterial null flux magnetic levitation track. The method includes arranging tessellating elements formed from stamped conductors.

In accordance with still yet other embodiments of the present invention, the elements may include conductive loops having first and second legs that are bent, between an upper end and a lower end of the conductive loop, to form an upper null flux crossing and a lower null flux crossing.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
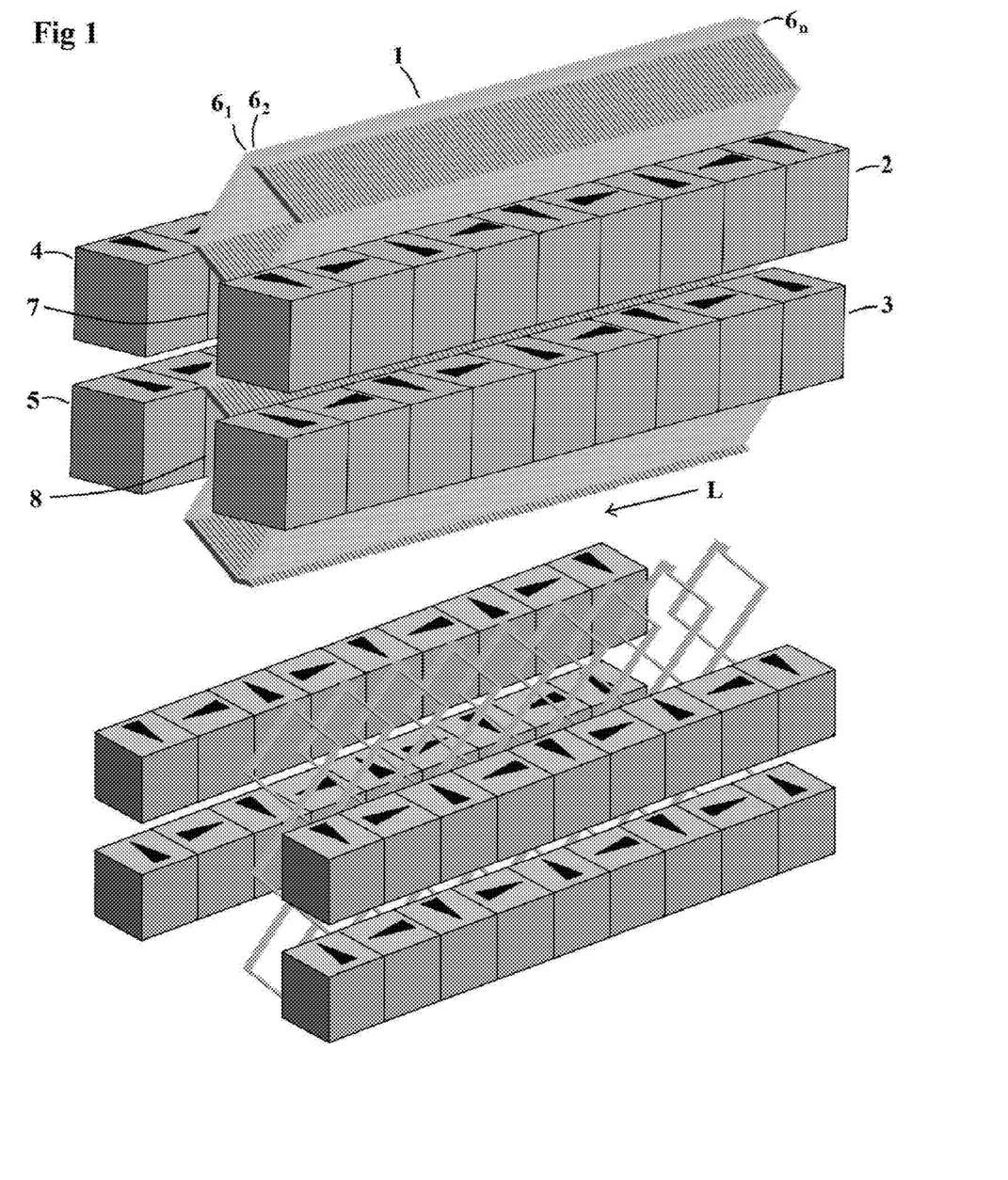
FIG. 1 illustrates a track for a transport system in accordance with embodiments.

FIG. 1 (upper illustration) illustrates an embodiment of a track for a magnetic bearing system, e.g., a magnetic levitation (maglev) system, and in particular, a passive maglev system. The maglev system uses a magnetic force created as a magnet assembly 2 is conveyed along track 1 at a velocity sufficient to generate lift to provide vertical displacement between magnet assembly 2 and the track 1. In this way, a levitation force is generated on magnet assembly 2, which is derived from the magnet assembly's motion along track 1. As illustrated, the system can include a plurality of magnetic arrays 2-5 connected in such a manner as to be substantially parallel to a length direction L of track 1. However, it is also understood that the system can operate with any combination of magnetic assemblies arranged on either side of track 1.

The N-pole direction for each individual magnet of magnet assemblies 2 and 3 are shown in FIG. 1. While the illustrated embodiment of the parallel magnet assemblies 2, 3 (upper illustration) are arranged as, e.g. a parallel Halbach array, it is understood that any magnet geometry can be utilized for the magnet assemblies without departing from the spirit and scope of the embodiments of the invention. Further, for ease of explanation of the illustrated embodiment, the lower illustration of FIG. 1 shows an expanded view of the track elements to reveal the orientation of the N-poles of the magnets in the parallel arrays 2, 3 and 4, 5 arranged on both lateral sides of the track. With respect to magnet assembly 2, viewed from left to right, a first magnet's N-pole points away from track 1, a second magnet's N pole, which is 90° offset from that of the first magnet, points opposite length direction L, a third magnet's N-pole, which is 90° offset from that of the second magnet, points toward track 1 and a fourth magnet's N-pole, which is 90° offset from that of the third magnet, points in length direction L. The orientation of N-poles in the succeeding magnets of magnet assembly 2 repeats that of the first four magnets. The N-poles of the magnets of magnet assembly 3 are opposite those of magnet assembly 2. In this regard, in magnet assembly 3, viewed from left to right, a first magnet's N-pole points toward track 1 (i.e., opposite the magnet of magnet assembly 2 arranged above it), a second magnet's N pole, which is 90° offset from that of the first magnet, points in length direction L (i.e., opposite the magnet of magnet assembly 2 arranged above it), a third magnet's N-pole, which is 90° offset from that of the second magnet, points away from track 1 (i.e., opposite the magnet of magnet assembly 2 arranged above it) and a fourth magnet's N-pole, which is 90° offset from that of the third magnet, points opposite length direction L (i.e., opposite the magnet of magnet assembly 2 arranged above it). Thus, the N-poles in respective magnets of the parallel arrays of magnet assemblies 2 and 3 arranged one above the other are oriented in opposite directions. Again, as noted above, it is understood that any magnet geometry can be utilized for the parallel magnet assemblies, orientations of the N-poles of the respective magnets of the parallel magnet assemblies different from those illustrated in the figures can be utilized without departing from the spirit and scope of the embodiments of the invention.

On an opposite lateral side of track 1, magnet assemblies 4 and 5 can be arranged, e.g., as parallel arrays. Further, when utilized with magnet assemblies 2 and 3, the N-poles of the first and third magnets of magnet assemblies 4 and 5 can be oriented in the same direction as the respective N-poles of the first and third magnets of magnet assemblies 2 and 3, while the N-poles of the second and fourth magnets of magnet assemblies 4 and 5 can be oriented in the opposite direction as the respective N-poles of the second and fourth magnets of magnet assemblies 2 and 3. Thus, as shown in FIG. 1, it is preferred that the N-poles in the magnet assemblies of the parallel arrays 2, 4 and/or 3, 5 on opposite lateral sides of track 1 rotate in opposite directions. Again, as the parallel magnet assemblies can use any magnet geometry, orientations of the N-poles of the magnets in magnet arrays 2, 4 and/or 3, 5 can be different from those illustrated in the figures without departing from the spirit and scope of the embodiments of the invention.

Figure 2:
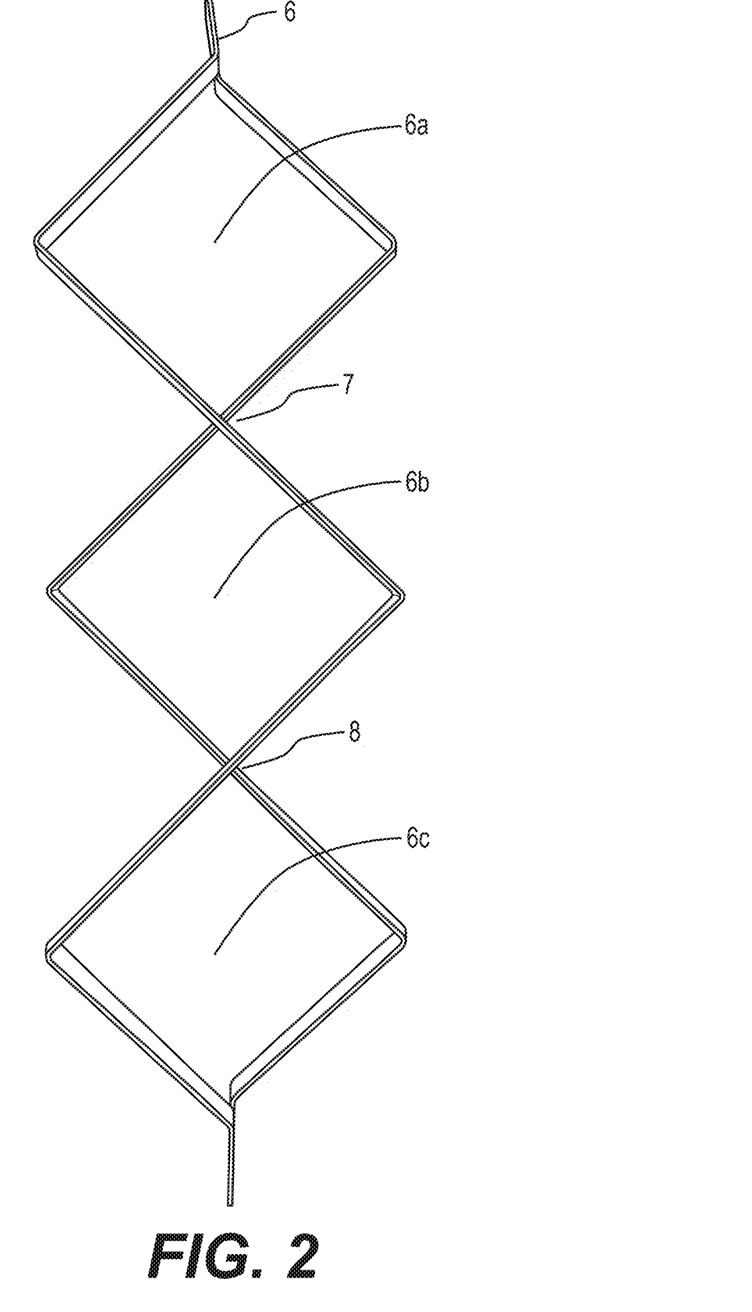
FIG. 2 illustrates a side view of an individual track foil or element.
Figure 3:
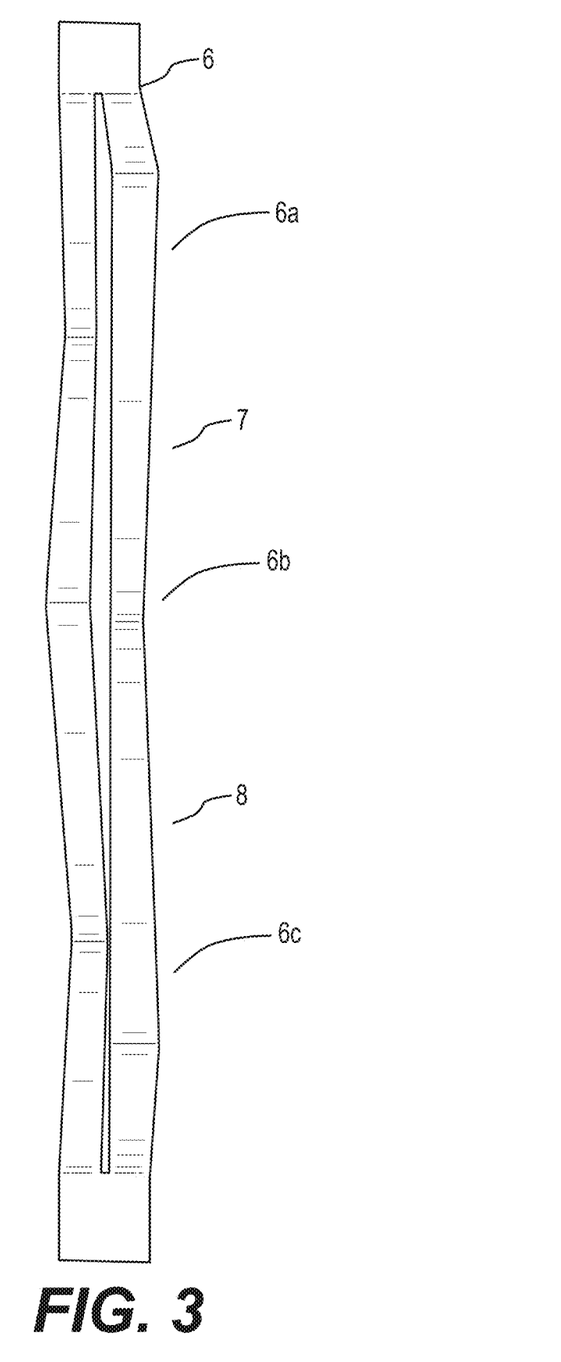
FIG. 3 illustrates a front view of the individual track element as depicted in FIG. 2.

As shown in FIG. 1 (upper illustration), track 1 can be embodied or formed by a stacked, tessellated set of shaped conductors $6_1$-$6_n$. Moreover, the lower illustration in FIG. 1, for ease of explanation and understanding, does not show each of the stacked shaped conductors, but only shows a few of the shaped conductors to clearly show the orientation of the stacked and overlapping shaped conductors in the formation of the track. Conductors $6_1$-$6_n$ can be formed of a suitable conductive material, e.g., aluminum, copper or other suitable alloys, which is stamped, bent or otherwise deformed to produce individual track foils or elements 6, as shown in FIGS. 2 and 3, which when stacked or tessellated, form a conductive metamaterial, as shown in FIG. 1. Track elements 6 can be slotted or solid. Alternatively, litz wire braid could also be used for conductor 6. In a further alternative, the heterogeneous non-isotropic conductive nature of the track could be achieved with segments of a "naturally" isotropic material such as graphite. Track element 6, when viewed in a direction that would be orthogonal to the length direction L of the track, is shown in FIG. 2. As shown, track element 6 can take a form that reveals a geometry similar to a plurality of vertically oriented loops or polygons 6a-6c, e.g., hexagons or diamonds, that are essentially stacked one atop the other, such that, in the exemplary embodiment, a bottom point of a top diamond 6a is connected to an upper point of a middle diamond 6b at crossing (or diamond) point 7 (which forms an upper null point) and an upper point of a bottom diamond 6c is connected to a bottom point of middle diamond 6b at crossing point 8 (which forms a lower null point). Track element 6, when viewed in a direction that would be from an end of track 1, is shown in FIG. 3. In the exemplary embodiment, which is provided merely for ease of explanation and understanding, track element 6 can be formed with three (3) equal cells constructed of bent sheets of 0.5 mm thickness aluminum at 45 degrees to the vertical, with short conductive strips completing the circuit at a top and bottom of the individual track element 6. Further, while track heights ranging from 6" to 40" tall have been considered preferable, it is understood that track 1 can be any desired height without departing from the spirit and scope of the embodiments of the invention.

Referring again to FIG. 1, at least one set of magnet arrays 2, 3 can be positioned one lateral side of track 1, so that magnet arrays 2, 3 are vertically offset and parallel to each other and each magnet array is substantially aligned in length direction L adjacent to crossing points 7 and 8. Moreover, as shown in the exemplary embodiment of FIG. 1, a second set of magnet arrays 4, 5 can also be utilized, in which each magnet array 4, 5 of the second set is arranged substantially horizontally parallel to respective magnet arrays 2, 3 of the first set, but positioned on the lateral side of track 1 opposite the first set. Thus, in the illustrated embodiment, track 1 and the configuration of magnet arrays 2-5 can be substantially anti-symmetrical with respect to a vertical plane through track 1 along length direction L. Moreover, as shown in the illustrated embodiment, a horizontal distance of the magnet arrays 2-5 to track 1 can be closer than a vertical distance between the magnet arrays 2, 3 or 4, 5 of a same set. While the illustrated embodiment depicts two sets of magnetic arrays 2-5 arranged on opposite lateral sides of track 1, it is understood that a single set of magnetic arrays 2, 3 or 4, 5 can be positioned on a single lateral side of track 1 without departing from the invention.

While the positioning of the magnet array in relation to each other and to the lateral side of track 1 is adjustable, it may be advantageous to space the magnet assemblies as close as possible to the lateral side of track 1 as positional tolerances allow and space the magnet assemblies of a same set a distance equal to the distance between the null crossing points.

When magnet arrays 2, 3 and/or 4, 5 are moving in length direction L, i.e., substantially along or parallel to the length of track 1, current may be produced within track 1. However, according to the above-discussed geometry/configuration of track elements 6, track elements 6 and the formed metamaterial of track 1 possess a null flux geometry so that, while magnet arrays 2, 3 and/or 4, 5 are in a designated neutral position, the magnets generate approximately zero electromotive force (EMF) and approximately zero current. When magnet arrays 2, 3 and/or 4, 5 are displaced relative to the neutral position, e.g., via the force of gravity, the null flux circuit experiences a net EMF due to Lenz's law, and the resulting current generates a set of opposing magnetic poles that exerts at least lift, drag, and orthogonal force on magnet arrays 2, 3 and/or 4, 5. Moreover, in the exemplary embodiment, the system can utilize track elements 6 shaped to form three generally stacked loops 6a-6c of substantially, but not necessarily, identical sizes, such that any torque or lateral deflection induced by an upper null flux crossing 7, e.g., where the two upper loops 6a, 6b meet, is substantially cancelled by the lower null flux crossing 8, e.g., where the two lower loops 6b, 6c meet. It is understood that this neutral position can be tuned to account for different properties of the vehicle, such as weight, by adjusting, e.g., the distance and/or orientation of magnet arrays 2, 3 and/or 4, 5.

The "neutral position" is the position where the net flux through the track's closed conducting loops is zero. This corresponds to each array 2, 3 and/or 4, 5 being aligned with its corresponding null flux crossing 7, 8. At the neutral position, the lack of flux results in no bulk currents being induced in track 1, and thus no reactive forces are experienced by the magnets of arrays 2, 3 and/or 4, 5. It is understood that some freedom in magnet positioning is permitted while retaining zero net flux. For example, magnet arrays 2, 3 and/or 4, 5, which can be fixed to individual supporting frames (not shown), can be moved in any direction relative to each other, or rotated relative to each other. The supporting frames are adjustable to position the magnet arrays 2, 3 and/or 4, 5 in their respective neutral positions where the net flux is zero. Such tuning may, for instance, result in a different force response (stiffness) when the supporting frame containing the magnets is moved from the neutral position. More specifically, displacing the left and right magnet arrays in the direction of travel can result in a net sideways force. Rotating the magnets slightly around the long axis breaks the symmetry of the neutral position, resulting in a different magnitude force resulting from displacement up or down by an equivalent distance. These tuning design options enhance versatility for different kinds of loads that may need different force characteristics.

Figure 4:
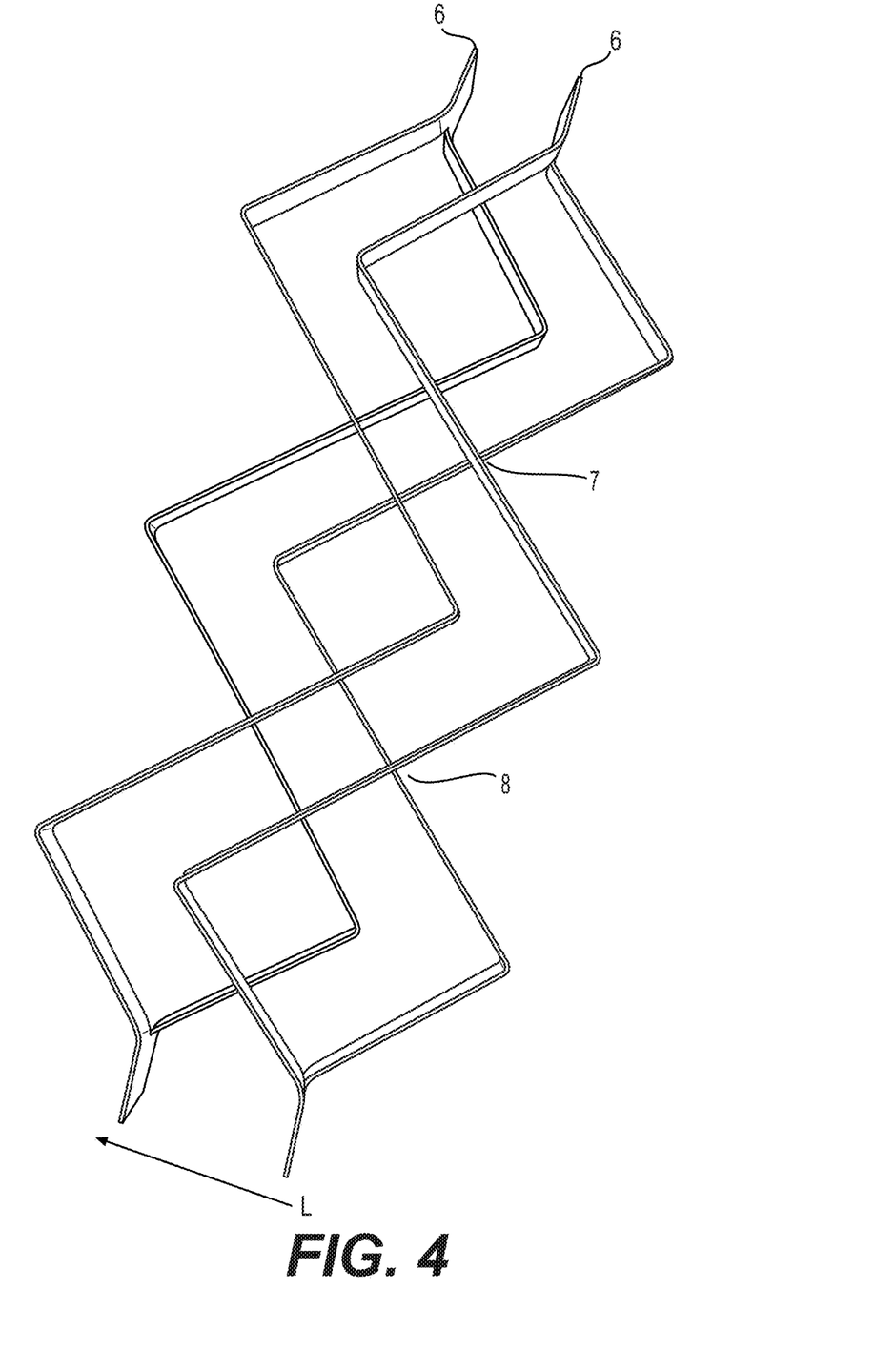
FIG. 4 illustrates the nesting of two individual track element as depicted in FIG. 2.
Figure 5:
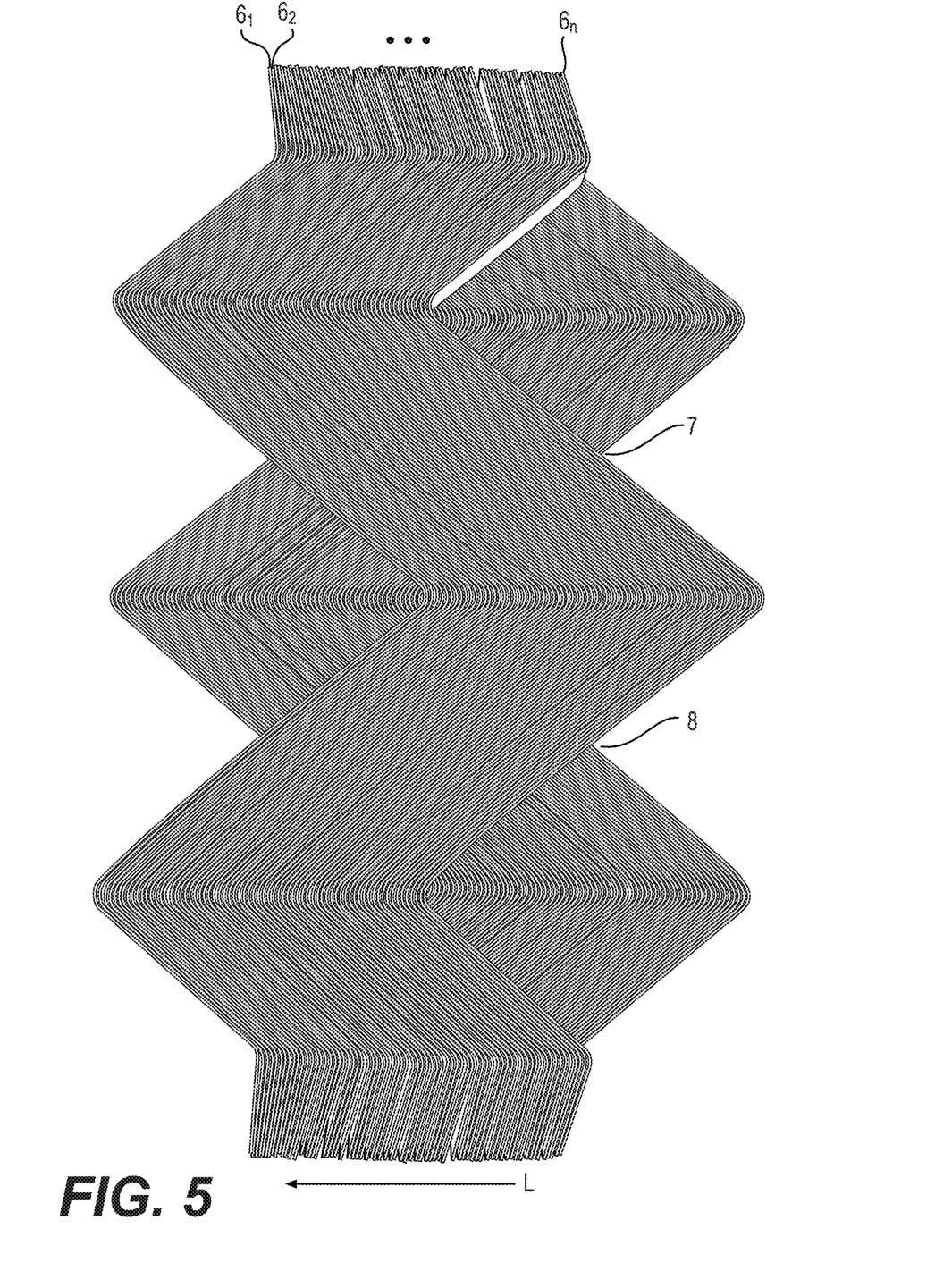
FIG. 5 illustrates the nesting of a number of individual track element forming a metamaterial and a portion of a track.
Figure 6:
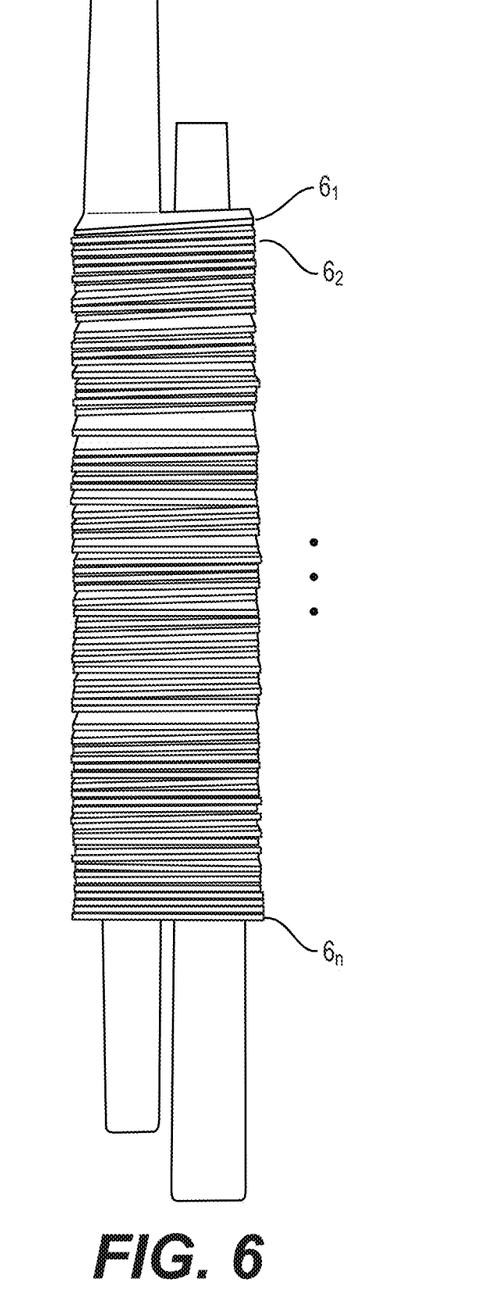
FIG. 6 illustrates a bottom view of the portion of the track depicted in FIG. 5.

In FIG. 4, track element 6 and a second track element 6', which are formed with identical shapes, can be nested together or stacked in length direction L to begin forming the tessellated metamaterial of track 1. FIG. 5 shows a number of individual track elements 6 nested together to form a portion of the metamaterial of track 1. In embodiments, track 1 can be formed from a very large number nested individual track elements 6 to produce track 1 with, e.g., 1300 elements per meter. Further, FIG. 6 shows a bottom view of at least a portion of track 1, which shows ends of a number of nested individual track elements 6 and of the formed metamaterial. Further, the nested individual track elements 6 can be fixedly joined via, e.g., glue, plastic or other suitable binder material. Moreover, an insulating layer is provided between each of the nested individual track elements 6. It is also understood that this insulating layer can be formed on the individual track elements 6 before nesting, e.g., aluminum oxide can be formed on the surface of an aluminum track element 6.

Track 1, which includes a metamaterial formed by nested individual track elements 6 separated by intermediate insulators, experience substantial inductive coupling to their adjacent elements, which has the effect of lowering the speed at which the impedance of the track shifts from primarily resistive to primarily inductive (the transition velocity) and increasing its asymptotic performance. All passive maglev systems rely on reactive RL (resistive-inductive) circuits to create a 'mirror' magnetic field which repels the vehicle's magnets. The extent to which the mirror works properly is determined by the circuits' inductance and resistance, which in turn depend on their geometry and construction. As a general rule, the inductive part of the circuit is responsible for lift while the resistive part is responsible for drag. As the speed increases, the inductive impedance, proportional to (speed·inductance), becomes dominant and the system performance increases. The lowest speed at which the track generates more lift than drag is called the "transition velocity." As speed increases, the track resistance increases due to skin effect and inductive shielding, until system performance peaks, representing the asymptotic performance limit of a passive maglev system.

While asymptotic impedance drag from a non-superconducting track is limited, physically, by the effect of the induced magnetic fields on the conductor's charge carriers, the above-described clever positioning of magnets can further improve performance by partially cancelling sources of drag. Because each magnetic pole experiences upward force from both induced poles and partial cancellation of drag forces, embodiments of the invention have much better lift-to-drag ratio characteristics than other passive maglev schemes.

Embodiments of the invention are directed to a method for forming a metamaterial by adjusting geometries of metal alloys in order to create a microstructured composite material with non-isotropic and/or non-homogenous macroscopic conductivity properties for a null flux system. An alloy, e.g., containing aluminum, copper, graphite or other suitable conductor, is first selected that balances system-specific factors, such as cost, value, and/or magnetic properties. The shape of the metal alloy is then configured to have a null flux geometry with specific properties in response to magnetic fields, such as, but not limited to, the shape of the magnetic field when current goes through a loop, the lift-to-drag ratio, lift-to-system mass ratio, and/or levitation length. A null flux geometry is created by the shearing of planar sheets of the alloy into an at least minimally twisted topology with minimal material strain. The design can use either or both chiralities, multiple transverse laminations, slots or layers to address eddy currents and/or magnetic field torsion. It can use one or more open loops of various sizes, two or more transverse sections to complete the current path, internal structures or reinforcing, and variable transverse cross sections for altered performance characteristics, ease of manufacturing, tracking, steering, guidance, stability, stiffness, or economy of production. The design can be interweaved with sections of active track or heterogeneously structured track for braking, propulsion, roll, pitch, yaw, and/or translation in either transverse direction.

Another embodiment of the present invention is directed to a method for assembling a track 1 from a number of track elements 6, which can be stacked together to form a metamaterial. To produce individual track elements 6, a roll of a conductor metal or metal alloy, such as aluminum, copper, graphite or other suitable conductor material, is first selected with a specific width of, e.g., 12", for example, and a specific thickness, e.g., 0.5 mm. The conductor roll is guided through machine, e.g., a bending machine or a stamping machine, such as a rotary bending machine, configured to deform the conductor material into a specific selected geometry, such as, e.g., the three-diamond configuration illustrated in FIG. 2. This configuration can be achieved by cutting a slit vertically through a discrete portion of the roll, which will create a first leg attached to the roll at one or both ends of the width having a length of, e.g., 0.25". The machine will then bend the first leg to less than 180 degrees at a plurality of points such that the first leg is provided with a zig-zagged shape. While the bend can be of equal angle, it is understood that the angles can be of unequal angles without depart from the spirit and scope of the invention. The machine will next slit and bend a second leg in a similar, albeit opposite, process, whereby the two legs in superimposition generally form open loop shapes, such as, e.g., diamonds. The completed track element 6 thus formed can be separated from the roll and the process can be repeated for forming additional track elements 6. A robot or person can then be used to place or nest individual track elements 6 to form the metamaterial of track 1.

Figure 7:
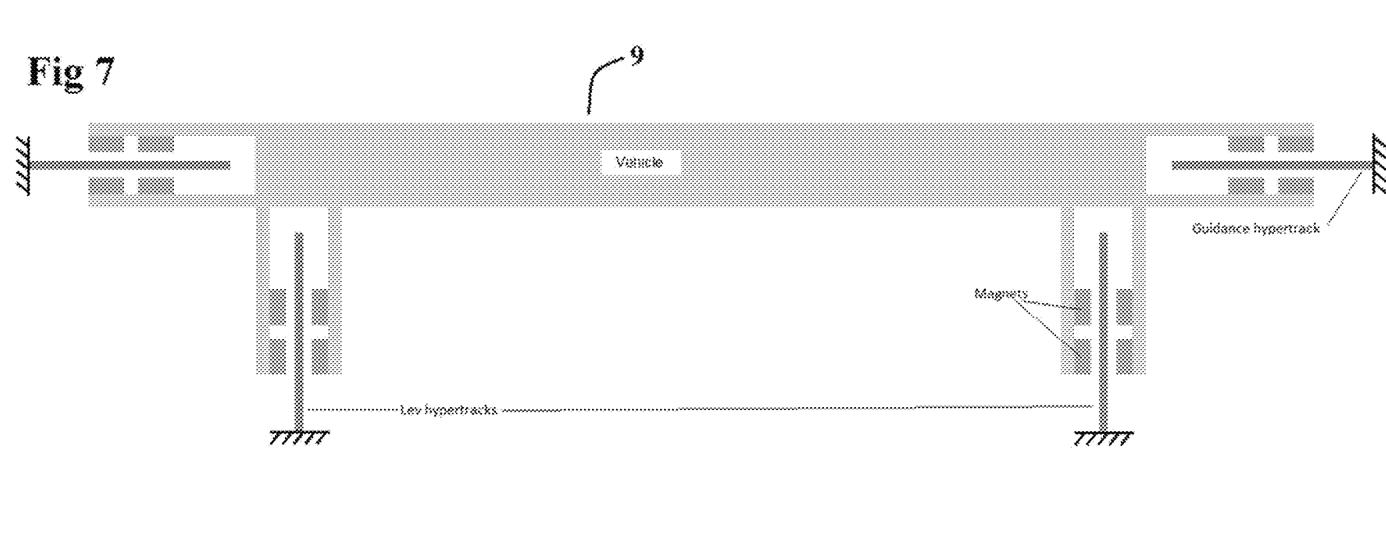
FIG. 7 illustrates multiple tracks mounted for a vehicle to be conveyed over the tracks.
Figure 8:
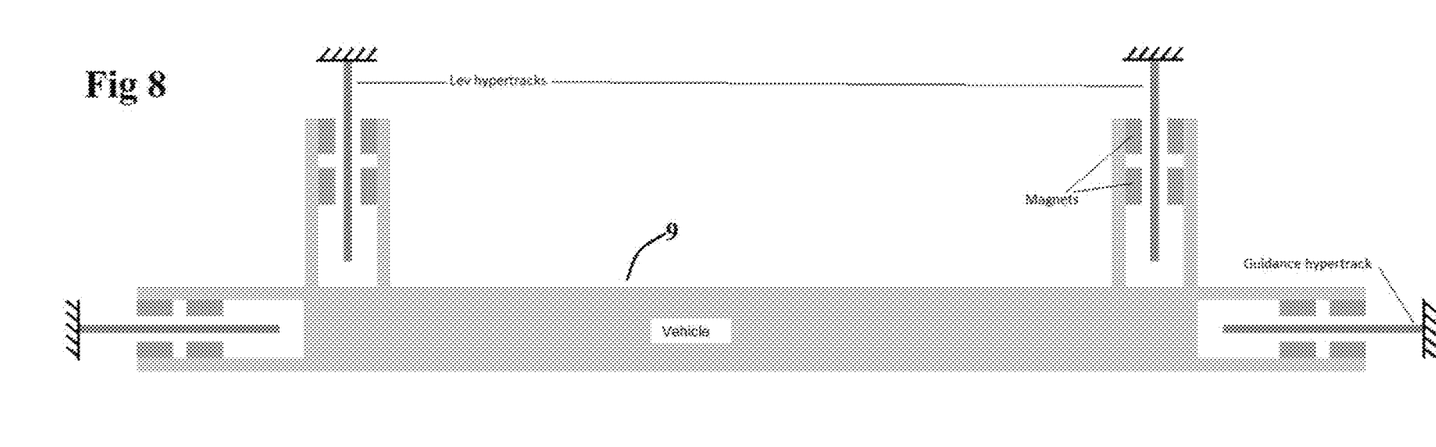
FIG. 8 illustrates multiple tracks mounted for a vehicle to be conveyed while suspended from the tracks.

In embodiments, a load connected to the magnet assemblies, such as a vehicle, can be conveyed along a plurality of tracks 1. For example, as shown in FIG. 7, two tracks 1 can be mounted to the ground or other suitable location so that the vehicle 9 travels over tracks 1. As shown in FIG. 7, vehicle 9 includes a U-shaped channel in which magnet assemblies are mounted, e.g., in a support frame (not shown), on both lateral sides of the tracks 1 to be aligned with the respective null flux crossings of tracks 1. Further, the vehicle can also include an additional U-shaped channel with magnet assemblies to be guided over a guidance track, which can be oriented normal to track 1, in order to increase stability of the system. Further, the guidance track can be constructed in a similar manner to track 1. In alternative embodiments, two tracks 1 can be mounted to a ceiling or other suitable location so that the vehicle 9 travels suspended from tracks 1, as shown in FIG. 8. In this alternative embodiment, vehicle 9 includes a U-shaped channel in which magnet assemblies are mounted, e.g., in a support frame (not shown), on both lateral sides of the tracks 1 to be aligned with the respective null flux crossings of tracks 1. Further, the vehicle 9 can again also include an additional U-shaped channel with magnet assemblies to be guided over a guidance track, which can be oriented normal to track 1, in order to increase stability of the system. Again, the guidance track can be constructed in a similar manner to track 1. It is further noted that track 1 or tracks 1 can alternatively be arranged at an angled orientation in relation to the vehicle without departing from the spirit and scope of the invention.

Figure 9:
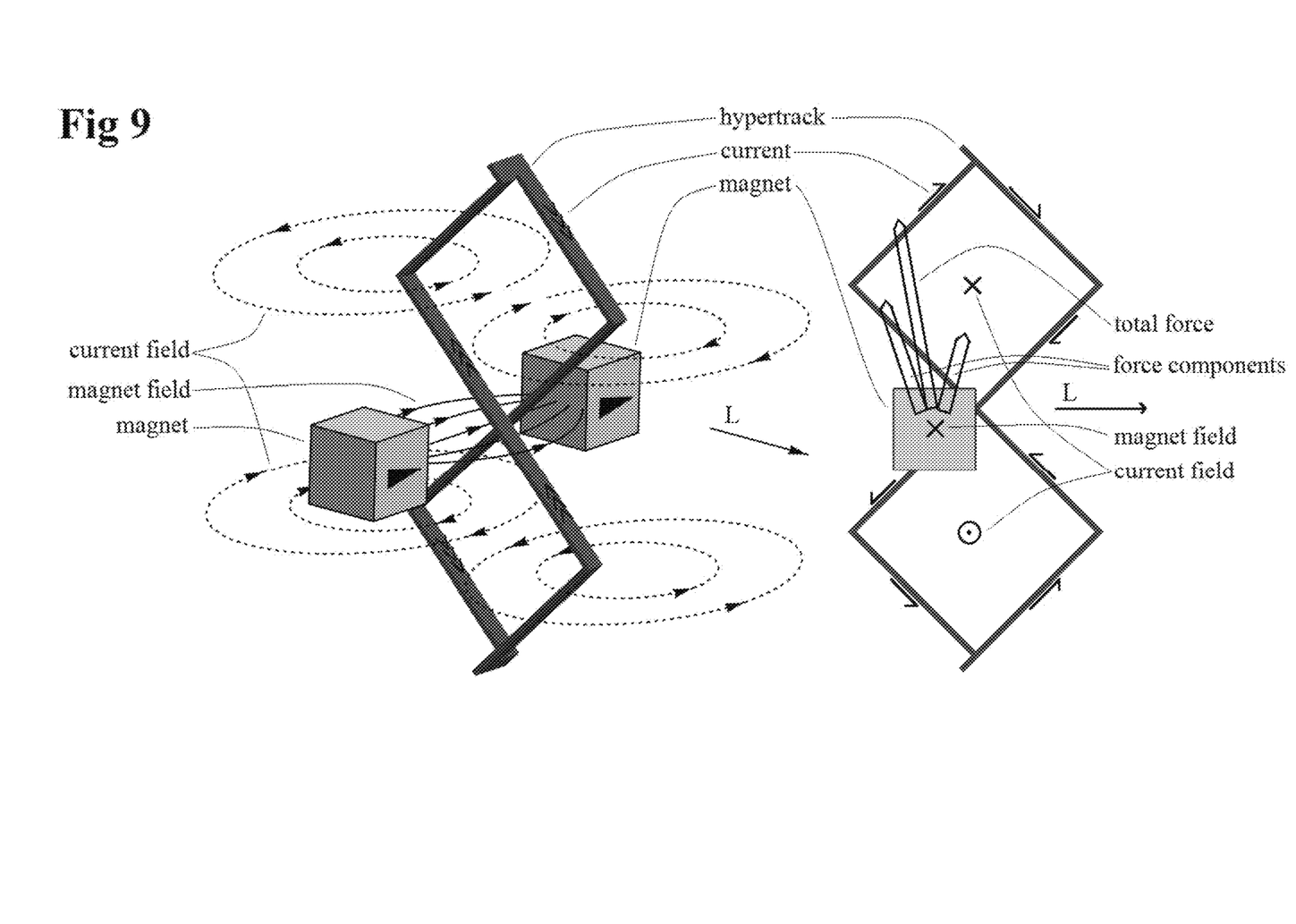
FIG. 9 illustrates a simplified diagram demonstrating with a single track element how embodiments of the invention improve lift/drag characteristics.

FIG. 9 is a simplified diagram demonstrating how a single track element (within a larger assembly) gives rise to improved lift/drag characteristics. The model includes a single pair of magnets (within a larger assembly) and a single "FIG. 8" loop of conductor. Relative motion of the magnets in the direction L induces currents when the magnets are displaced relative to the crossing ("null flux") point. These currents oppose the applied flux in accordance with Lenz's law. The center of current generation is displaced slightly forward of the center of magnetic field (shown in the side view) leading to drag. The effect of the induced currents and their magnetic fields is to exert forces on the magnets, shown in components and in sum. The geometry of the null flux configuration acts to partially cancel drag forces and to add lift forces, improving the lift/drag ratio compared to any system that does not utilize this phenomenon.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A track element of a non-contact bearing extending in a length direction, the track element comprising:
   a conductive material strip having a facing surface with a height and width and a rear surface opposite the facing surface;
   the conductive material strip includes a slit extending in a height direction to form a first leg and a second leg;
   the first leg being bent in a zig-zag shape;
   the second leg being bent in a zig-zag shape that is complementary to the bending of the first leg,
   wherein, when viewing the conductive material strip from a width side in a direction parallel to the facing surface, the first leg and the second leg cross each other at least once.

2. The track element according to claim 1, wherein the first and second legs are configured to be parallel to each other.

3. The track element according to claim 1, wherein, along the slit, the first and second leg are arranged in a non-contacting manner.

4. The track element according to claim 1, wherein the first and second leg are connected to each other at at least one of a top or a bottom of the slit.

5. The track element according to claim 4, wherein the first and second leg are connected to each other at both the top and bottom of the slit.

6. The track element according to claim 1, wherein a material of the conductive material strips comprises one of a conductor metal or metal alloy.

7. The track element according to claim 6, wherein the one of conductor metal or metal alloy comprises aluminum, copper, or graphite.

8. The track element according to claim 1, wherein the conductive material strip has a height of 12", a thickness of 0.5 mm, and the first and second legs have widths of 0.25".

9. The track element according to claim 1, wherein the first and second leg, when viewed in the direction parallel to the facing surface, cross each other at least twice.

10. The track element according to claim 1, wherein a null flux crossing is establishable where the first and second leg, when viewed parallel to the facing surface, cross each other.

11. A non-contact bearing comprising:
 a plurality of track elements according to claim 1,
 the plurality of track elements being nested together so that the facing surface of one of the conductive material strips is parallel to the rear surface of an adjacent one of the conductive material strips.

12. The non-contact bearing according to claim 11, wherein the plurality of track elements that are nested together are fixedly joined together.

13. The non-contact bearing according to claim 12, wherein the plurality of track elements that are nested together are fixedly joined together by glue or plastic.

14. The non-contact bearing according to claim 11, further comprising an insulating layer arranged between each conductive material strip.

15. The non-contact bearing according to claim 14, wherein the insulating layer comprises aluminum oxide.

16. The non-contact bearing according to claim 15, wherein the aluminum oxide insulating layer is formed on the facing surface and the rear surface of each conductive material strip.

17. A method for forming a non-contact bearing having a length direction, the method comprising:
 nesting a plurality of track elements together in the length direction,
 wherein each track element is configured so that, when the plurality of track elements are nested together, at least one null flux crossing is establishable in the length direction.

18. The method according to claim 17, wherein each track element comprises a conductive material strip having a facing surface with a height and width and a rear surface opposite the facing surface;
 wherein each conductive material strip includes a first leg bent in a zig-zag shape and a second leg bent in a zig-zag shape that is complementary to the bending of the first leg, and
 wherein, when the conductive material strip is viewed in a direction parallel to the facing surface, the first leg and the second leg cross each other at least once.

19. The method according to claim 18, wherein the track elements are nested together so that the facing surface of one of the conductive material strips is parallel to the rear surface of an adjacent one of the conductive material strips.

20. The method according to claim 18, wherein, before nesting the plurality of track elements together, the method comprises forming an insulating layer on at least one of the facing surface or rear surface of each conductive material strip, so that the each of nested track elements are separated from each other by an insulating layer.

21. The method according to claim 17, wherein each track element is configured so that, when the plurality of track elements are nested together, at least two null flux crossings, which are establishable in the length direction, are separated in a height direction of the non-contact bearing.

* * * * *